(12) United States Patent
Burg et al.

(10) Patent No.: US 6,587,458 B1
(45) Date of Patent: Jul. 1, 2003

(54) METHOD AND APPARATUS FOR AN INTERNET CALLER-ID DELIVERY PLUS SERVICE

(75) Inventors: Frederick Murray Burg, West Long Branch, NJ (US); Kathleen S. Meier-Hellstern, Cranbury, NJ (US); Lev Slutsman, Wayside, NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/368,242

(22) Filed: Aug. 4, 1999

(51) Int. Cl.⁷ .............................................. H04L 12/66
(52) U.S. Cl. ...................... 370/356; 370/356; 370/355; 370/352
(58) Field of Search ................................ 370/255, 352, 370/356; 379/93.23, 93.35, 112, 215

(56) References Cited

U.S. PATENT DOCUMENTS

| 5,473,677 A |   | 12/1995 | D'Amato et al. | 379/112 |
| 5,724,412 A |   | 3/1998 | Srinivasan | 379/93.23 |
| 5,805,587 A | * | 9/1998 | Norris | 370/352 |
| 5,809,128 A |   | 9/1998 | McMullin | 379/215 |
| 5,896,444 A | * | 4/1999 | Perlman | 377/93.35 |
| 5,946,381 A |   | 8/1999 | Danne et al. | 379/142 |

FOREIGN PATENT DOCUMENTS

| AU | 98/B-59680 | 3/1998 |
| EP | 0 794 643 A2 | 9/1997 |
| EP | 0 800 325 A2 | 10/1997 |
| EP | 0 856 981 A2 | 8/1998 |
| EP | 0 905 959 A2 | 3/1999 |
| WO | 97/37483 | 10/1997 |
| WO | 97/46073 | 12/1997 |
| WO | 97/47118 | 12/1997 |
| WO | 97/47119 | 12/1997 |
| WO | 97/47127 | 12/1997 |
| WO | 98/01985 | 1/1998 |
| WO | 98/07266 | 2/1998 |
| WO | 98/19240 | 5/1998 |
| WO | 98/19448 | 5/1998 |
| WO | 98/19471 | 5/1998 |
| WO | 98/24224 | 6/1998 |
| WO | 98/36551 | 8/1998 |
| WO | 98/41032 | 9/1998 |
| WO | 98/51063 | 11/1998 |
| WO | 98/53617 | 11/1998 |
| WO | 98/54871 | 12/1998 |
| WO | 99/14924 | 3/1999 |

* cited by examiner

Primary Examiner—Dang Ton
Assistant Examiner—Robert W. Wilson
(74) Attorney, Agent, or Firm—McIntyre Harbin & King

(57) ABSTRACT

A method and apparatus for an Internet Caller-ID Delivery Plus Service is presented. The telephone numbers and Internet accounts of a subscriber are aggregated in a database, with one of the telephone numbers being designated as the primary contact number for the subscriber. When the primary contact number is called by a caller attempting to reach the subscriber, the corresponding telephone numbers and Internet accounts of the subscriber are retrieved from the database by the Service. Each telephone number, including the primary contact number, is then dialed by the Service and the call is connected to the first numbers answered. In the case where none of the subscriber's telephone numbers are answered, each Internet account is analyzed to determine if the subscriber is currently on-line. If the subscriber is on-line, a pop-up window with the caller's ID will appear on the screen.

25 Claims, 3 Drawing Sheets

METHOD AND APPARATUS FOR AN INTERNET CALLER-ID DELIVERY PLUS SERVICE

BACKGROUND OF THE INVENTION

1. Field of the Invention

The present invention relates to a method and apparatus for an Internet Caller-ID Delivery Plus Service, and more particularly, to a method and apparatus allowing for the identification of and communication with a telephone caller over the Internet.

2. Description of the Art

Subscribers of telecommunication service providers are expecting, and in fact demanding, new and better customer services that are easier to use. As use of the Internet has grown, subscribers are now demanding the same telephone services they enjoy over the Public Switched Telephone Network (PSTN) be available over the Internet as well. This has pushed telecommunication providers to provide services to their subscribers which make telecommunication contact easier and better even in the Internet realm.

As telecommunication service providers seek to provide these new services, new techniques need to be developed. For example, U.S. Pat. No. 5,473,677, issued Dec. 5, 1995 to D'Amato et al., which is hereby incorporated by reference, relates to providing real-time call control within a telecommunications network. Real-time call control is provided using a call selection processor which is separate from the switches that carry the call. The call selection processor responds to in-coming calls and uses information carried in the associated signaling messages to determine what application processor, if any, should be involved on the call. This permits selected calls to be differentiated from other calls so as to allow the selected calls to receive special treatment.

In enabling selected calls to be differentiated for special treatment, such features as call waiting have been implemented over the Internet. For instance, U.S. Pat. No. 5,805,587, issued Sep. 8, 1998 to Noris et al., relates to alerting a service subscriber whose telephone is connected to the Internet of a waiting call via that Internet connection. A waiting call to a subscriber may be forwarded via the public switched network to a services platform which in turn establishes a connection to the subscriber using the Internet. A platform then notifies the subscriber of the waiting call via the Internet connection. The platform may then forward the telephone call to the subscriber via the Internet responsive to a subscriber request to do so without interrupting the subscriber's Internet connection.

In addition to additional services such as call waiting, many subscribers of telecommunication service providers want Caller-ID. This is especially true in regard to the use of the service over the Internet. An attempt at providing this type of service was made in U.S. Pat. No. 5,724,412, issued Mar. 3, 1998 to Srinivasan, which relates to providing a telephone service subscriber with Internet information related to a caller attempting to call the subscriber. Identification information relating to the caller is provided to the called party via the Internet after a caller has attempted to reach the called party. However, while providing the subscriber with the caller's information via the Internet, this patent only offers limited service and does not provide for attempting to reach the subscriber via alternative phone numbers nor does it allow for contact of the caller via the Internet by the subscriber by use of a click-to-dial pop-up window after such delivery of identification information.

Thus, it can be seen that while some services have been successfully provided and implemented, such as the call waiting service, other services, such as the Caller-ID service, still leave a lot to be desired and need to be integrated by the telecommunication server providers in a fashion that is usable and convenient for the service subscribers.

SUMMARY OF THE INVENTION

Accordingly, the present invention provides a method and apparatus for an Internet Caller-ID Delivery Plus Service. Upon receipt of a telephone call by a long-distance provider originating switch, the telephone call having been routed to the long-distance provider originating switch by a local exchange carrier in the area from which the telephone call was placed, the long distance provider originating switch will attempt to contact the service subscriber via the primary telephone number (i.e., the telephone number the caller has dialed) and any alternative telephone numbers associated with the service subscriber. In this manner, the present invention provides the service subscriber with a Find Me! Service.

If attempts to reach the service subscriber via the telephone fail, the present invention provides the service subscriber with an Internet Caller-ID Delivery Plus Service. The long-distance provider originating switch will contact a service control point requesting an initiation of the Internet caller-ID delivery. In response, the service control point contacts a web service control point associated with the service subscriber's Internet presence. The web service control point contacts the service subscriber's Internet Service Provider (ISP), and depending upon the service subscriber's Internet on-line status (i.e., whether the subscriber is on-line or not), will either deliver a pop-up Click-to-Dial Caller-ID window message or an E-Mail message identifying the caller.

The present invention, including its features and advantages, will become more apparent from the following detailed description with reference to the accompanying drawings.

DETAILED DESCRIPTION

Figure 1:
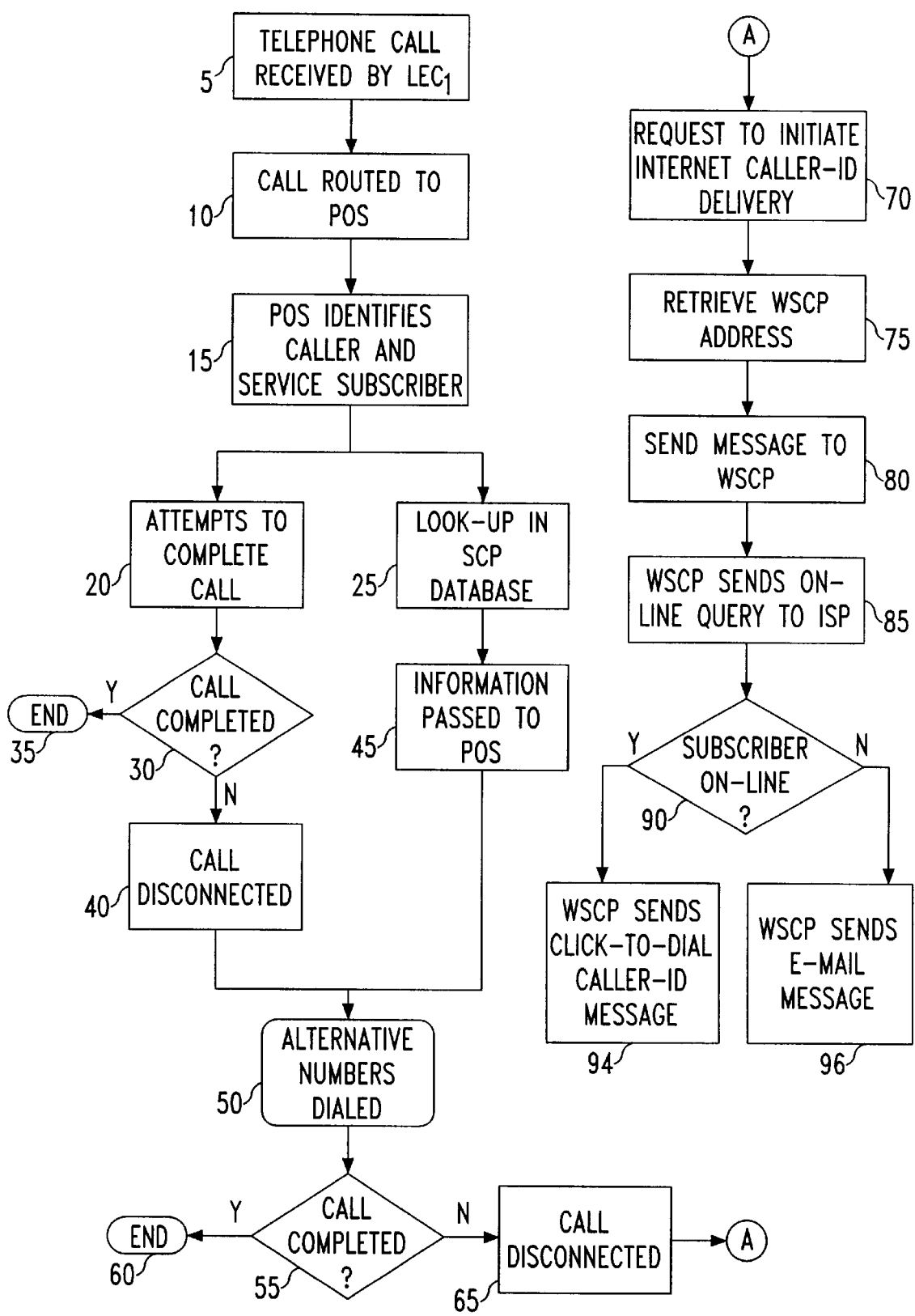
FIG. 1 illustrates a flow chart of a method for an Internet Caller-ID Delivery Plus Service, according to an embodiment of the present invention.
Figure 2:
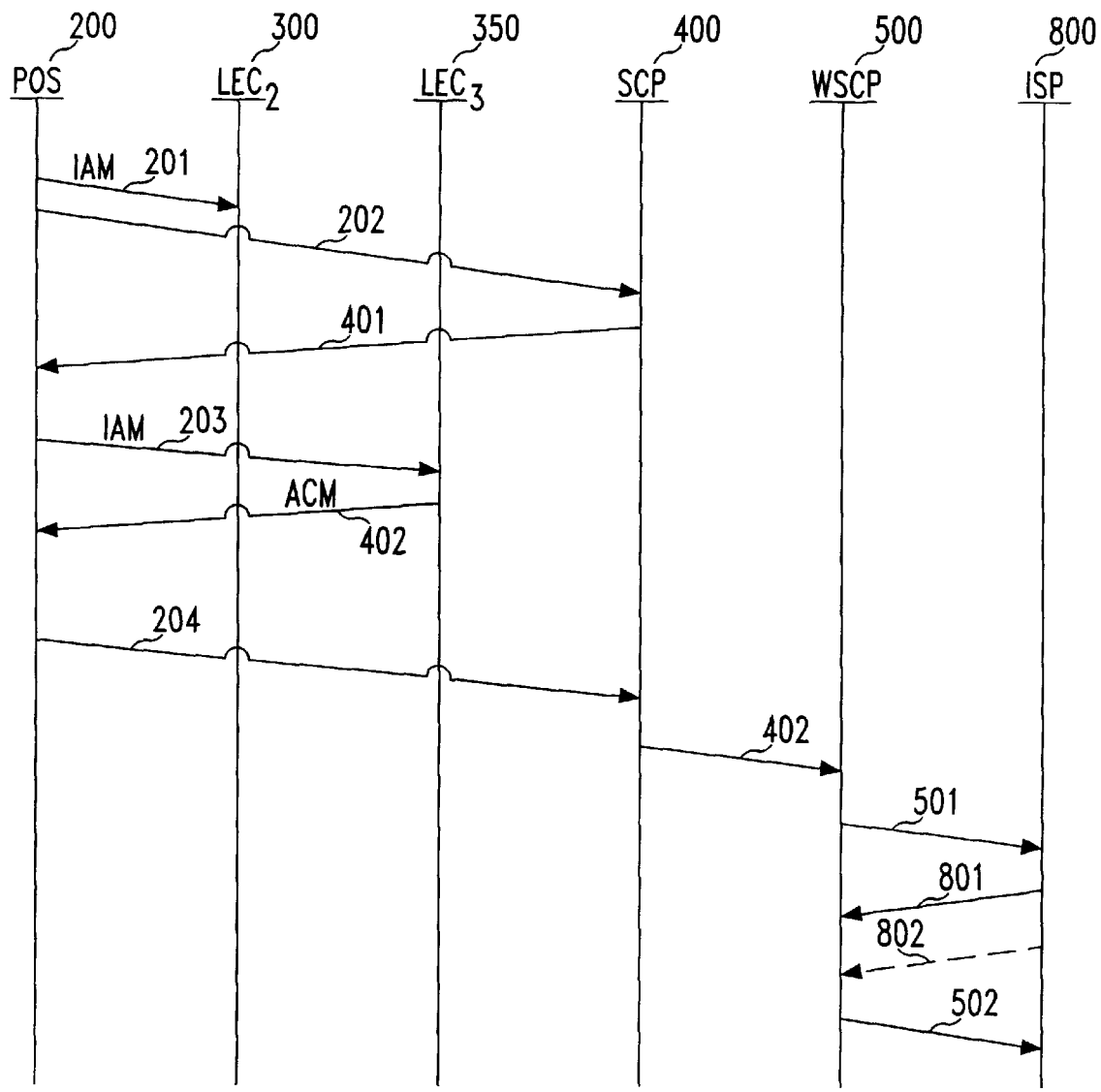
FIG. 2 illustrates a message flow chart for an Internet Caller-ID Delivery Plus Service, according to an embodiment of the present invention.
Figure 3:
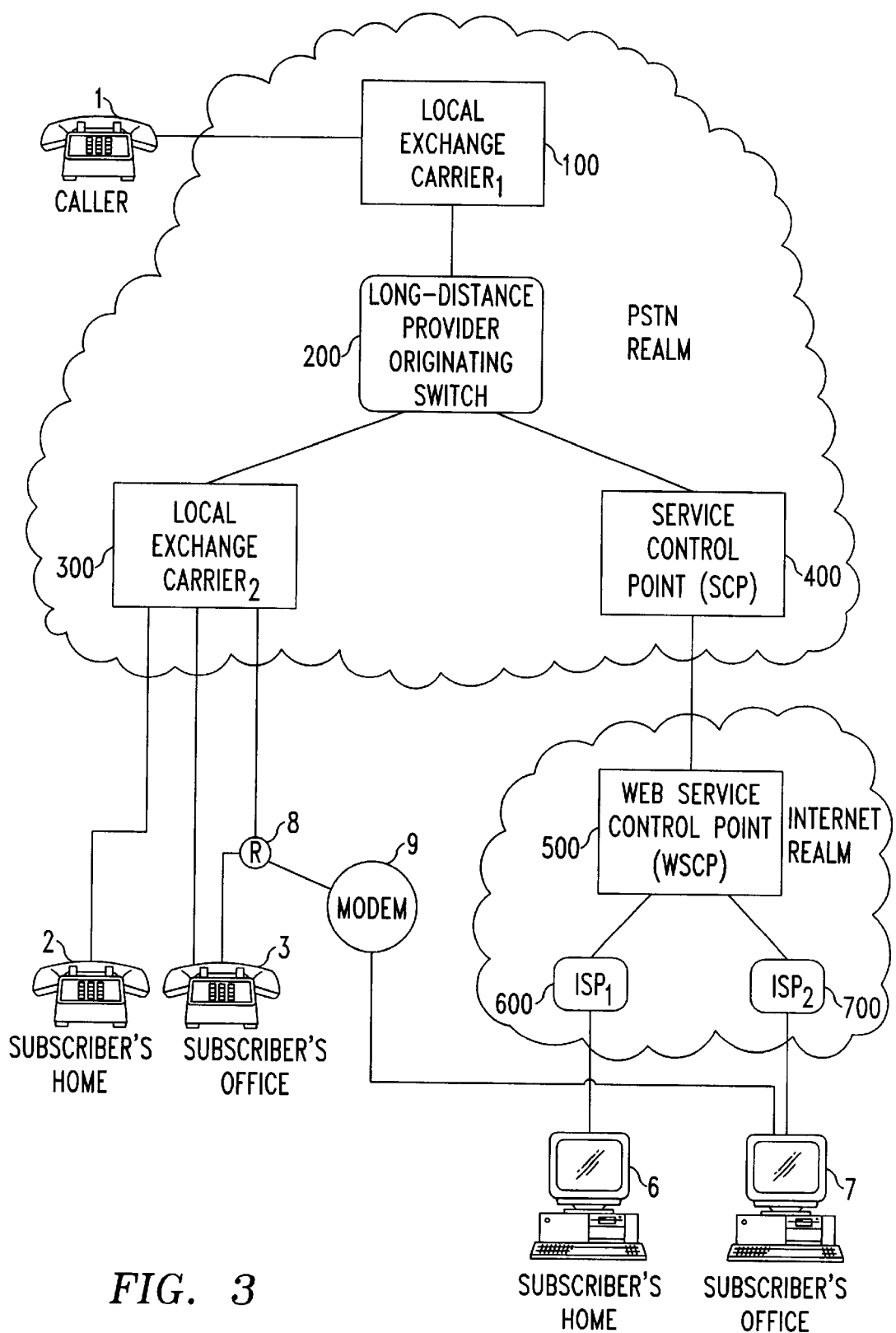
FIG. 3 illustrates an apparatus for an Internet Caller-ID Delivery Plus Service, according to an embodiment of the present invention.

FIGS. 1 through 3 illustrate a method and apparatus for an Internet Caller-ID Delivery Plus Service consisting of a Find Me! Service, an E-Mail Delivery Service, and an Internet Pop-up Window Caller-ID Delivery with Click-to-Dial Service.

Referring to FIG. 1, in Step 5, when a long-distance telephone call is placed by a caller, that telephone call is first received by a first Local Exchange Carrier ($LEC_1$). Which LEC will receive the telephone call is determined, of course, by which local telephone company provides the local telephone service in the area in which the call is being placed or, in the case where more than one LEC provides service in the same area, by which local telephone company provides the local telephone service to the calling party. The $LEC_1$ thus will first carry the incoming call by routing it, in Step 10, to a long-distance service Provider's Originating Switch (POS), owned and operated, for example, by a long-distance telephone company such as AT&T. Unless special provisions are made, the callee will, of course, be a service subscriber of the long-distance telephone company which will carry the call.

In Step 15 then, the POS identifies the caller, i.e., the person who is placing the call, and the callee, i.e., the person to whom the call is being placed, by the well-known caller/callee identification methods. For instance, the POS can conduct such identification by using the call's associated call record and, on the basis of the caller's and callee's telephone numbers, checking the caller's/callee's identification and verifying the called number belongs to a service subscriber of the long-distance service provider. Having conducted caller/callee identifications and verification of the service subscriber, in Step 20, the POS will attempt to complete the call to the service subscriber by routing the telephone call to the appropriate Local Exchange Carrier ($LEC_2$). The appropriate $LEC_2$ is determined, of course, by which LEC provides local telephone service in the area in which the service subscriber resides.

In parallel to the POS attempting to complete the call, in Step 25, the POS will look up in a Service Control Point (SCP) database, on the basis of the telephone number called, any alternative telephone numbers for the service subscriber. The SCP database thus contains the primary telephone number (PTN; i.e., the telephone number dialed by the caller) and alternative telephone contact numbers for the service subscriber. The SCP database table may thus look, for example, something like:

| Subscriber PTN | Alternative #1 | Alternative #2 | WSCP IP address |
|---|---|---|---|
| 732-922-0712 | 732-922-0726 | 732-420-3752 | 135.16.20.73 |

Thus, for example, if the caller is attempting to reach the service subscriber and has dialed the number 732-922-0712, the POS will find that the service subscriber has two alternative telephone contact numbers at which he or she may be reached. Further, as can be seen above, the database may also contain further information relating to the service subscriber. In this case, the data in the SCP database table also includes a Web Service Control Point (WSCP) Internet Protocol (IP) address. The functionality of this additional data will be explained in further detail below.

Continuing with the telephone call, in Step 30 a determination of whether the call is completed is made. Such determination is made by monitoring the status of the call. If the call is completed (i.e., the service subscriber picks up the receiver of the telephone), in Step 35 the call is connected and no further service is needed. The call connection is, of course, handled in the normal fashion. If the call is not completed, however, in Step 40 the call is disconnected from the number dialed by the caller. Such disconnection can occur, for example, after a specified number of rings have occurred without the service subscriber picking up the call.

In parallel to the determination being made of whether the call has been completed or not, in Step 45 the alternative contact numbers for the service subscriber are passed from the SCP database to the POS. If the call has been completed, the information is ignored by the POS. However, if the call has not been completed, the service subscriber's alternative telephone contact number information is used in the next step.

Thus, in Step 50, using the information passed by the SCP database, the first of the alternative numbers for the service subscriber is dialed. Again, as in step 35, in Step 55 a determination of whether the call is completed is made. If the service subscriber picks up the call, the need for further service ends and, in Step 60, the call is connected in the normal fashion. If, however, the service subscriber does not pick up the call (e.g., after the predetermined number of rings has been reached), in Step 65 the call is disconnected from the alternative number dialed by the service. If there is more than one alternative number, the second alternative number is then dialed by the service and Steps 50 and 55 are repeated for that second number. Such dialing of alternative numbers and disconnections from those subsequent alternative numbers dialed continues until either the service subscriber picks up the call or all alternative numbers have been dialed at least once (thus in effect repeating steps 50 and 55 as many times as needed). In this manner then, in attempting to reach the service subscriber at the primary telephone number dialed by the caller and at the alternative telephone numbers dialed by the service, the service has in effect provided the service subscriber with a "Find Me!" Service.

If all attempts at reaching the service subscriber via the telephone fail, then the call is terminally disconnected in Step 65. Such terminal disconnection can, of course, occur when the caller hangs up, or may occur when the service itself disconnects the call. In such a case where the service disconnects the call, a message may be played to the caller stating that the service subscriber is not at the number the caller called nor at any of the alternative numbers dialed by the service.

Having failed to reach the service subscriber by phone, service for the service subscriber continues in Step 70 in that the POS requests the SCP to initiate Internet Caller-ID delivery. Thus, in Step 75, the SCP retrieves from its database the Web Service Control Point (WSCP) Internet Protocol (IP) address associated with the service subscriber. This is the additional information referred to above contained in the database table relating to the service subscriber. In the example database table shown above, the WSCP IP address is 135.16.20.73.

Having retrieved the WSCP address for the service subscriber, in Step 80 the SCP will send to the WSCP a message that the caller was attempting to contact the service subscriber. In Step 85, having received the message relating to the attempted contact of the service subscriber by the caller, the WSCP will send an on-line query to the service subscriber's Internet Service Provider (ISP). The service subscriber's ISP is identified by the WSCP by a look-up of the WSCP's database. The database table may look, for example, something like:

| Subscriber PTN | $ISP_1$ IP address | Subscriber IP | E-Mail address |
|---|---|---|---|
| 732-922-0712 | 251.244.120.1 | Lslutsman + sigh*such | Lslutsman@monmouth.com | where the data for the service subscriber's IP (i.e., third data block) may be an IP address of the subscriber (if the subscriber has one) or a log-in/password for the subscriber's ISP. Thus as can be seen, the WSCP database can contain a multitude of data relating to the service subscriber's presence on the Internet. In such a manner then, the WSCP has the ability to act as an Internet proxy, database, service logic depository and service executor. In its Internet proxy capacity, the WSCP relays messages to the involved ISP provider(s). In its database capacity, the WSCP contains a number of the database table shown above for each service subscriber. In its service logic depository capacity, the WSCP contains the service subscriber's accounts containing the service logic programs indexed by the subscriber's PTN. Finally, in its service executor capacity, the WSCP executes the subscriber specific programs resulting in sending signaling messages towards the POS and ISP(s).

In Step 90, then, a determination of whether the subscriber is on-line is conducted. Such determination can be made by the subscriber's ISP by a check of the subscriber's Internet account. If the account is currently active (i.e., in use), it can be presumed that the subscriber is on-line. It is to be understood, of course, that a query message will be sent to each of the service subscriber's ISPS, presuming the service subscriber has more than one ISP.

If it is determined that the service subscriber is on-line, in Step 94 the WSCP will send a pop-up window Click-to-Dial Caller-ID message. The pop-up window will contain a message that lets the service subscriber know that the caller had attempted to reach the subscriber and will identify that caller. Further, the window will contain a click-to-dial feature so that the service subscriber can contact the caller. The pop-up window, it is to be understood of course, is accomplished according to the Internet Service Provider's normal procedures for pop-up windows. The Click-to-Dial Service can be conducted according to the disclosure of U.S. patent application Ser. No. 222,903, and which is hereby incorporated by reference. If it is determined that the service subscriber is not on-line, in Step 96 the WSCP will send to the service subscriber's ISP instructions to place an E-Mail message in the service subscriber's E-Mail box identifying the caller and relating the fact that the caller had attempted to reach the service subscriber. In this manner then, the service is able to provide both an E-Mail Delivery Service and an Internet Pop-up Window Caller-ID Delivery with Click-to-Dial Service.

Referring now to FIG. 2, a possible message flow for the Internet Caller-ID Delivery Plus Service is shown. In this example, a caller has already placed a call and his or her local exchange carrier (not shown) has routed that call to the long-distance Provider Originating Switch (POS) 200. Thus, upon receipt of the routed call from the caller's local exchange carrier, POS 200 will send an initial address message (IAM) 201 to the service subscriber's Local Exchange Carrier$_2$ (LEC$_2$) 300. As described above, the POS identifies the caller and callee, verifies the callee is a service subscriber, and determines where to send the call. In this instance, LEC$_2$ 300 is the local exchange carrier for the telephone number which the caller has dialed to contact the service subscriber.

At the same time, POS 200 will send a message 202 to the Service Control Point (SCP) 400 to look up caller and callee information in the SCP database (not shown). SCP 400 will respond with message 401 sending back to POS 200 information pertaining to the caller and callee. This information, as explained above, will include the service subscriber's PTN and any alternative contact telephone numbers.

If the service subscriber fails to answer the telephone to which the call has been connected by LEC$_2$ 300, POS 200 will send an initial address message (IAM) 203 to the Local Exchange Carrier$_3$ (LEC$_3$) 350. In this instance, LEC$_3$ is the local exchange carrier of the alternative number automatically dialed by POS 200 when the service subscriber failed to answer the call to the original number dialed (i.e., the call handled by LEC$_2$ 300). In the case where the service subscriber is at the location of the telephone to which the call has been connected by LEC$_3$ 350 and picks up the call, an acknowledgment message (ACM) 402 will be sent back to POS 200. If such an acknowledgment message is sent, as above, this indicates the call has been completed and the service will end. The call, of course, will be handled in the normal fashion.

If, however, the service subscriber fails to pick up the telephone call at the telephone to which the call was routed by LEC$_3$ 350, POS 200 will send message 204 to SCP 400. Message 204, as described previously, is a request to initiate Internet Caller-ID Delivery. Also as described previously, the SCP will then retrieve the appropriate service subscriber's Web Service Control Point (WSCP) 500 address from the SCP database table.

Having retrieved the appropriate WSCP 500 address, SCP 400 will send message 402 to WSCP 500. Receiving the request to initiate Internet Caller-ID Delivery message 204, WSCP 500 will then send an on-line query to the service subscriber's Internet Service Provider (ISP). WSCP 500 will perform a look-up in its own database for the service subscriber's ISP(s). Thus, in this example, WSCP 500 sends on-line query message 501 to ISP 800.

Upon receipt of message 501, ISP 800 will respond to WSCP 500 with message 801 indicating whether or not the service subscriber is currently then on-line. If the service subscriber is on-line, the WSCP 500 responds with message 502 containing instructions for a Caller-ID Click-to-Dial pop-up window message. As described above, this Caller-ID Click-to-Dial pop-up window message contains caller identification information as well as a Click-to-Dial service. If, however, the service subscriber is not on-line, WSCP 500 responds with message 502 to ISP 800 containing information in the form of an E-Mail message identifying the caller with instructions to ISP 800 to place that message in the service subscriber's E-Mail folder. It is to be understood, of course, that the E-Mail message may contain further information and instructions.

In the instance where the on-line status of the service subscriber changes before either the Caller-ID Click-to-Dial pop-up window message or the E-Mail message is sent by WSCP 500, ISP 800 will send an updated on-line status message 802 to WSCP 500. For instance, if after message 801 has been sent to WSCP 500 indicating that the service subscriber is in fact currently on-line, the service subscriber logs out, thus changing the service subscriber's on-line status, ISP 800 will send message 802 indicating the change of the subscriber's on-line status. In this manner then, WSCP 500 will send the correct type of message to ISP 800 concurrent with the service subscriber's on-line status.

Referring now to FIG. 3, an example of an architecture by which the Internet Caller-ID Delivery Plus Service can be accomplished, according to an embodiment of the present invention, is shown. A caller will place a telephone call over telephone 1. Telephone 1, it is to be understood, of course, may be any type of telephone (e.g., a home or office telephone, a portable cellular telephone, etc.). The telephone call so placed by the caller from telephone 1 will be carried by the telephone caller's Local Exchange Carrier$_1$ (LEC$_1$)

100. Which local exchange carrier will carry the phone call is, of course, determined upon the caller's location and which local exchange carrier services that area. $LEC_1$ 100 will recognize that the caller is attempting to place a long-distance telephone call and will route the call over the Public Switched Telephone Network (PSTN) realm to the appropriate long-distance Provider Originating Switch (POS) 200. This is determined by the local exchange carrier based on the caller's long-distance service. The long-distance POS 200 using an ANI look-up table will determine the identity and location of the callee's location.

In this case, POS 200 routes the call to $LEC_2$ 300. $LEC_2$ 300 is the local exchange carrier for the service subscriber. Thus, $LEC_2$ 300 will route the call to the telephone number which the caller has dialed from telephone 1. Assuming that the caller has dialed the service subscriber's home telephone number 2, $LEC_2$ 300 will route the call to the subscriber's home. If the subscriber is not home and/or fails to pick up the phone, POS 200 will instruct $LEC_2$ 300 to place the call through to the service subscriber's office telephone 3. Again, if the service subscriber is not in his office and/or the telephone call is not answered, POS 200 will contact the Service Control Point (SCP) 400 to initiate Internet Caller-ID Delivery.

At this point, SCP 400 will hand off delivery to the Web Service Control Point (WSCP) 500. WSCP 500 resides in the Internet realm and controls delivery of the appropriate messages to the service subscriber's Internet service provider. In this case, the service subscriber's home computer 6 and office computer 7 are serviced by different ISPS. $ISP_1$ 600 services the subscriber's home computer 6, whereas $ISP_2$ 700 services the subscriber's office computer 7.

In the case where the service subscriber's office telephone 3 and office computer 7 are connected to the same outside line, a router 8 will recognize the appropriate telephone or computer signal and route the call accordingly. If router 8 recognizes a computer signal, then the signal will be routed to modem 9 for connection to computer 7. What is not shown in FIG. 3 are the well-known ISP to LEC connections for handling such a situation. However, in the case where such a situation occurs, the $ISP_2$ 700 will pass the Caller-ID Click-to-Dial pop-up window message or the E-Mail message to the $LEC_2$ 300 according to the normal well-known transfer protocols.

Thus as can be seen from the above embodiments of the present invention, a flexible communication and Caller-ID service is provided to the service subscriber. The present invention will direct telephone calls to each of the service subscriber's telephones allowing for a Find Me! Service. Further, if the service subscriber is unavailable for telephonic communication, the present invention will flexibly deliver Caller-ID messages over the Internet to the subscriber, depending on the subscriber's on-line status, in the form of either a Caller-ID Click-to-Dial pop-up window or an E-mail.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method of providing an Internet Caller-ID Delivery Plus Service, the method comprising the steps of:

connecting a call for a subscriber to at least one of a telephone number dialed, an alternative number, and at least one supplemental alternative number;

sending an on-line query, if the call has not been connected to at least one of the numbers dialed, for a determination of whether the subscriber is on-line on the Internet, wherein, if the subscriber is on-line, sending a Click-to-Dial Caller-ID message to the subscriber, and wherein, if the subscriber is not on-line, sending an E-Mail message instead.

2. The method according to claim 1, further comprising:

providing a database that stores said alternative number and said at least one supplemental alternative telephone number; and retrieving from said database said alternative number or said at least one supplemental alternative telephone number of the subscriber in accordance with success in reaching the caller.

3. The method according to claim 1, further comprising the step of:

determining if the call has been connected to one of the telephone number dialed and the at least one alternative telephone number.

4. The method according to claim 3, further comprising the step of:

discontinuing the Internet Caller-ID Delivery Plus Service if the call has been connected.

5. The method according to claim 1, further comprising the step of:

requesting a Service Control Point to initiate Internet Caller-ID delivery.

6. The method according to claim 1, further comprising the step of:

retrieving a Web Service Control Point Internet Protocol address for the subscriber.

7. The method according to claim 1, further comprising the step of:

notifying the Web Service Control Point that the call had been placed, but not connected, to the subscriber.

8. The method according to claim 1, wherein the on-line query is sent to the subscriber's at least one ISP.

9. The method according to claim 1, wherein one of the Click-to-Dial Caller-ID message and the E-Mail message is delivered to the subscriber by the subscriber's at least one ISP.

10. The method according to claim 1, further comprising the step of: identifying a caller from a telephone number from which the caller has placed the call.

11. A method of delivery caller identification information over the Internet, the method comprising the steps of:

receiving a message for a subscriber at an initial address;

attempting delivery of the message to at least one of an initial address, an alternative address, and at least one supplemental alternative address for the subscriber;

determining if the subscriber is on-line on the Internet if delivery of the message has not been accomplished using at least one of the addresses;

sending a Click-to-Dial Caller-ID message to the subscriber if it has been determined that the subscriber is on-line; and sending an E-Mail message if it has been determined that the subscriber is not on-line.

12. The method according to claim 11, further comprising the steps of:
   providing a database that stores said alternative address and said at least one supplemental alternative telephone address; and
   retrieving from said database one of said addresses for the subscriber.

13. The method according to claim 11, further comprising the steps of:
   determining if the message has been delivered to one of the subscriber's initial address and alternate address.

14. The method according to claim 13, further comprising the steps of:
   discontinuing any further message delivery if it has been determined the message has been delivered to one of the subscriber's initial address and alternate address.

15. The method according to claim 11, further comprising the steps of:
   sending a message to initiate a Internet Caller-ID function.

16. The method according to claim 11, further comprising the steps of:
   retrieving an Internet Protocol address for the subscriber.

17. The method according to claim 16, wherein at least one of the Click-to-Dial Caller-ID message and the E-Mail message are delivered to the subscriber's Internet Protocol address.

18. The method according to claim 11, further comprising the steps of:
   identifying a sender of the message for the subscriber.

19. An apparatus of an Internet Caller-ID Delivery Plus Service, the apparatus comprising:
   an originating switch having the capability to route a telephone call to a subscriber at one of a telephone number dialed, an alternate number, and a supplemental alternate number;
   a service control point, connected to the originating switch, which controls initiation of an Internet message delivery on the basis of whether the telephone call was successfully routed to the subscriber at one of the numbers dialed; and
   a web service control point, connected to the service control point, which controls initiation of delivery of one of a Click-to-Dial Caller ID message and an E-Mail message to the subscriber.

20. The apparatus according to claim 19, further comprising:
   a database which stores alternate numbers for the subscriber.

21. The apparatus according to claim 19, wherein the web service control point determines whether the subscriber is on-line on the Internet.

22. The apparatus according to claim 19, wherein delivery of the Click-to-Dial Caller-ID message is initiated if the subscriber is on-line.

23. The apparatus according to claim 19, wherein delivery of the E-Mail message is initiated if the subscriber is not on-line.

24. The apparatus according to claim 19, wherein delivery of at least one of the Click-to-Dial Caller-ID message and the E-Mail message is coordinated by an Internet Service Provider.

25. The apparatus according to claim 19, further comprising:
   means for delivery of at least one of the Click-to-Dial Caller-ID message and the E-Mail message.

* * * * *